US010801372B2

(12) United States Patent
Rousseau

(10) Patent No.: US 10,801,372 B2
(45) Date of Patent: Oct. 13, 2020

(54) COOLING MODULE AND METHOD FOR REJECTING HEAT FROM A COUPLED ENGINE SYSTEM AND RANKINE CYCLE WASTE HEAT RECOVERY SYSTEM

(71) Applicant: Modine Manufacturing Company, Racine, WI (US)

(72) Inventor: Tony Rousseau, Racine, WI (US)

(73) Assignee: MODINE MANUFACTURING COMPANY, Racine, WI (US)

( * ) Notice: Subject to any disclaimer, the term of this patent is extended or adjusted under 35 U.S.C. 154(b) by 80 days.

(21) Appl. No.: 15/522,792

(22) PCT Filed: Oct. 28, 2015

(86) PCT No.: PCT/US2015/057739
§ 371 (c)(1),
(2) Date: Apr. 28, 2017

(87) PCT Pub. No.: WO2016/069707
PCT Pub. Date: May 6, 2016

(65) Prior Publication Data
US 2017/0335723 A1  Nov. 23, 2017

Related U.S. Application Data

(60) Provisional application No. 62/073,156, filed on Oct. 31, 2014.

(51) Int. Cl.
*F01K 23/10* (2006.01)
*F01K 9/00* (2006.01)
(Continued)

(52) U.S. Cl.
CPC .............. *F01K 23/10* (2013.01); *F01K 9/003* (2013.01); *F01K 23/065* (2013.01);
(Continued)

(58) Field of Classification Search
CPC .. F28F 9/0246; F28F 9/262; F28F 1/10; F28F 9/002; F28D 1/05366; F28D 1/0452;
(Continued)

(56) References Cited

U.S. PATENT DOCUMENTS

| 5,046,554 A | * | 9/1991 | Iwasaki ................. B60K 11/04 123/41.49 |
| 5,086,835 A | | 2/1992 | Shinmura |

(Continued)

FOREIGN PATENT DOCUMENTS

| JP | 2014118880 A | 6/2014 |
| KR | 20030021864 A | 3/2003 |

OTHER PUBLICATIONS

International Search Report and Written Opinion for Application No. PCT/US2015/057739 dated Jan. 20, 2016 (58 pages).

*Primary Examiner* — Mark A Laurenzi
*Assistant Examiner* — Edward Bushard
(74) *Attorney, Agent, or Firm* — Michael Best & Friedrich LLP; Jeroen Valensa; Michael Bergnach

(57) ABSTRACT

A cooling module is coupled to an engine system and a Rankine cycle waste heat recovery system. The cooling module includes a heat exchanger for cooling a fluid of the engine system and a condenser for cooling a working fluid of the Rankine cycle waste heat recovery system, both of which extend in a width direction of the cooling module and are porous to a flow of cooling air in a depth direction of the cooling module. The condenser includes a first tubular header that extends in a height direction of the cooling module. A working fluid transfer tube fluidly couples the first tubular header to the Rankine waste heat recovery cycle system. The working fluid transfer tube has a first portion extending in the depth direction and a second portion
(Continued)

extending in the height direction, the second portion being adjacent to the first tubular header in the width direction.

13 Claims, 7 Drawing Sheets

(51) Int. Cl.
| | |
|---|---|
| *F28F 1/10* | (2006.01) |
| *F01K 23/06* | (2006.01) |
| *F28F 9/26* | (2006.01) |
| *F28F 9/02* | (2006.01) |
| *F28D 1/053* | (2006.01) |
| *F28D 1/04* | (2006.01) |
| *F28F 9/00* | (2006.01) |
| *F02B 29/04* | (2006.01) |
| *F28D 21/00* | (2006.01) |

(52) U.S. Cl.
CPC ........ *F02B 29/0462* (2013.01); *F28D 1/0452* (2013.01); *F28D 1/05366* (2013.01); *F28F 1/10* (2013.01); *F28F 9/002* (2013.01); *F28F 9/0246* (2013.01); *F28F 9/262* (2013.01); *F28D 2021/0082* (2013.01); *F28D 2021/0084* (2013.01); *F28D 2021/0094* (2013.01); *Y02T 10/12* (2013.01)

(58) Field of Classification Search
CPC ..... F28D 2021/0082; F28D 2021/0084; F28D 2021/0094; F01K 23/10; F01K 9/003; F01K 23/065; F02B 29/0462; Y02T 10/146; Y02T 10/16; Y02T 10/166
USPC .......................................................... 60/618
See application file for complete search history.

(56) References Cited

U.S. PATENT DOCUMENTS

| | | | |
|---|---|---|---|
| 5,458,190 A | 10/1995 | Sasaki et al. | |
| 5,934,102 A | 8/1999 | Dekeuster et al. | |
| 5,946,940 A * | 9/1999 | Inoue | F25B 39/04 165/132 |
| 6,029,345 A * | 2/2000 | Christensen | B60K 11/04 165/140 |
| 6,059,019 A * | 5/2000 | Brost | F01P 3/18 123/41.51 |
| 6,223,556 B1 | 5/2001 | Dekeuster et al. | |
| 6,305,465 B1 | 10/2001 | Uchikawa et al. | |
| 6,364,403 B1 * | 4/2002 | Ozawa | B60K 11/04 296/187.09 |
| 6,470,961 B1 * | 10/2002 | Case | B60K 11/04 165/140 |
| 6,789,613 B1 * | 9/2004 | Ozaki | F01P 3/18 165/132 |
| 6,817,404 B2 * | 11/2004 | Frana-Guthrie | F01P 3/18 165/43 |
| 6,935,129 B2 * | 8/2005 | Sasaki | B60H 1/00328 62/238.4 |
| 7,077,194 B2 | 7/2006 | Wisniewski et al. | |
| 7,178,579 B2 * | 2/2007 | Kolb | F02B 29/0412 123/563 |
| 7,320,360 B2 | 1/2008 | Leitch et al. | |
| 7,721,796 B2 * | 5/2010 | Kalbacher | F28F 9/0209 165/167 |
| 8,176,750 B2 * | 5/2012 | Higashiyama | F25B 39/028 62/515 |
| 8,327,654 B2 * | 12/2012 | Taylor | F01P 5/04 165/43 |
| 8,479,856 B2 * | 7/2013 | Leronseur | B60K 11/04 180/68.1 |
| 8,776,517 B2 * | 7/2014 | Ernst | F01K 9/04 60/39.182 |
| 8,776,873 B2 * | 7/2014 | Mross | F28D 1/05391 165/176 |
| 9,062,901 B2 * | 6/2015 | Jeon | F25B 39/028 |
| 9,689,594 B2 * | 6/2017 | Johnson | F25B 39/028 |
| 2003/0062456 A1 * | 4/2003 | Nakagawa | B60H 1/00464 248/200 |
| 2005/0103016 A1 | 5/2005 | Radcliff et al. | |
| 2005/0217832 A1 * | 10/2005 | Sanada | F28D 1/0452 165/140 |
| 2006/0060327 A1 * | 3/2006 | Yu | F16H 57/04 165/70 |
| 2006/0225421 A1 | 10/2006 | Yamanaka et al. | |
| 2007/0007771 A1 | 1/2007 | Biddle et al. | |
| 2007/0144713 A1 * | 6/2007 | Sugimoto | F28D 1/0452 165/140 |
| 2010/0025007 A1 * | 2/2010 | Fell | F01P 3/18 165/44 |
| 2010/0163324 A1 * | 7/2010 | Jyoutaki | B60K 11/04 180/68.1 |
| 2011/0083920 A1 * | 4/2011 | Mori | B60H 1/025 180/68.4 |
| 2011/0120792 A1 * | 5/2011 | Carron | B60K 11/04 180/68.1 |
| 2011/0127005 A1 * | 6/2011 | Keerl | F01P 3/18 165/51 |
| 2011/0220335 A1 | 9/2011 | Fujii et al. | |
| 2011/0304176 A1 * | 12/2011 | Kihara | B60K 11/04 296/193.09 |
| 2012/0024494 A1 * | 2/2012 | Grasso | B60K 11/04 165/51 |
| 2012/0285170 A1 * | 11/2012 | Mori | B60H 1/3227 60/670 |
| 2012/0305228 A1 | 12/2012 | Arino et al. | |
| 2013/0126126 A1 | 5/2013 | Kim et al. | |
| 2014/0007600 A1 | 1/2014 | Johnson et al. | |
| 2014/0102679 A1 * | 4/2014 | Matsudaira | B60K 11/04 165/143 |

\* cited by examiner

COOLING MODULE AND METHOD FOR REJECTING HEAT FROM A COUPLED ENGINE SYSTEM AND RANKINE CYCLE WASTE HEAT RECOVERY SYSTEM

CROSS-REFERENCE TO RELATED APPLICATIONS

This application claims priority to U.S. Provisional Patent Application No. 62/073,156, filed on Oct. 31, 2014, the entire contents of which are hereby incorporated by reference.

BACKGROUND

The present invention relates to power systems with coupled waste heat recovery bottoming cycles.

Increasing the operating efficiency of heat engines and other power producing cycles has become more desirable as the cost of fuels has steadily increased. Additionally, the desire by both individuals and governmental bodies to reduce pollutants and other undesirable byproducts of fuel consumption has led to further interest in such increases. One recognized means by which such increases may be realized is waste heat recovery.

In a typical waste heat recovery system, thermal energy produced as a byproduct of a fuel-consuming process that would otherwise be wasted (e.g. discharged to the ambient as a waste stream) is captured and converted to useful work. One well-known thermodynamic cycle used for waste heat recovery is the Rankine cycle, wherein a working fluid is pressurized as a liquid, vaporized by receiving the waste heat, non-adiabatically expanded to recover mechanical work, and condensed and cooled to complete the cycle.

The combustion of fuel-air mixtures to produce power is similarly known. Typically, the combustion process converts chemical energy that is present in the fuel, in combination with a supply of oxygen, to mechanical work, leaving some amount of that energy as waste heat. At least some of this waste heat can be used as the heat source for a Rankine bottoming cycle in order to increase the overall power conversion efficiency of a power generation system.

Providing such coupled systems is seen as an especially promising approach to improving the fuel economy of vehicles. Improving fuel economy is desirable, both in light of the economic returns that can be realized by reducing the rate of fuel consumption, as well as in recognition of the undesirable impact that the end products of fuel consumption may have on the environment. However, the limited space availability for packaging a combined power system on a vehicle can be a severe obstacle to realizing such coupled systems. The challenges are often most difficult to overcome in providing cooling systems to reject the waste heat to ambient from such a coupled system.

SUMMARY

According to an embodiment of the invention, a cooling module for rejecting heat from a coupled engine system and Rankine cycle waste heat recovery system includes a condenser for cooling and condensing a working fluid of the Rankine cycle waste heat recovery system, and a heat exchanger for cooling a fluid of the engine system. The condenser has a core with fluid conduits extending in the width direction of the cooling module between a pair of tubular headers. The heat exchanger has a heat exchange core with fluid conduits extending along the width direction between a pair of fluid tanks A working fluid transfer tube fluidly couples one of the tubular headers to the Rankine cycle system, and has a first portion extending in the cooling module depth direction and a second portion extending in the cooling module height direction.

According to another embodiment of the invention, a method of operating a cooling module to reject heat from a coupled engine system and Rankine cycle waste heat recovery system includes directing a flow of vaporized working fluid from the Rankine cycle waste heat recovery system past an air moving device to a condenser of the cooling module, directing a flow of compressed charge air past the air moving device to a charge air cooler of the cooling module, and directing a flow of engine coolant from the engine system past the air moving device to a radiator of the cooling module. A first flow of air is received through the condenser, and heat is transferred from the flow of Rankine cycle working fluid to the first flow of air passing through the condenser to cool and condense the flow of Rankine cycle working fluid to a liquid. A second flow of air separate from the first flow of air is received through the charge air cooler, and heat is transferred from the flow of compressed charged air to the second flow of air passing through the charge air cooler in order to cool the flow of compressed charge air. The first flow of air is received through the radiator after the heat has been transferred to it from, the Rankine cycle working fluid, and heat is transferred to that first flow of air from the engine coolant. The liquid Rankine cycle working fluid is directed part the air moving device to the Rankine cycle waste heat recovery system, and the cooled engine coolant and cooled charge air are directed past the air moving device to the engine system.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
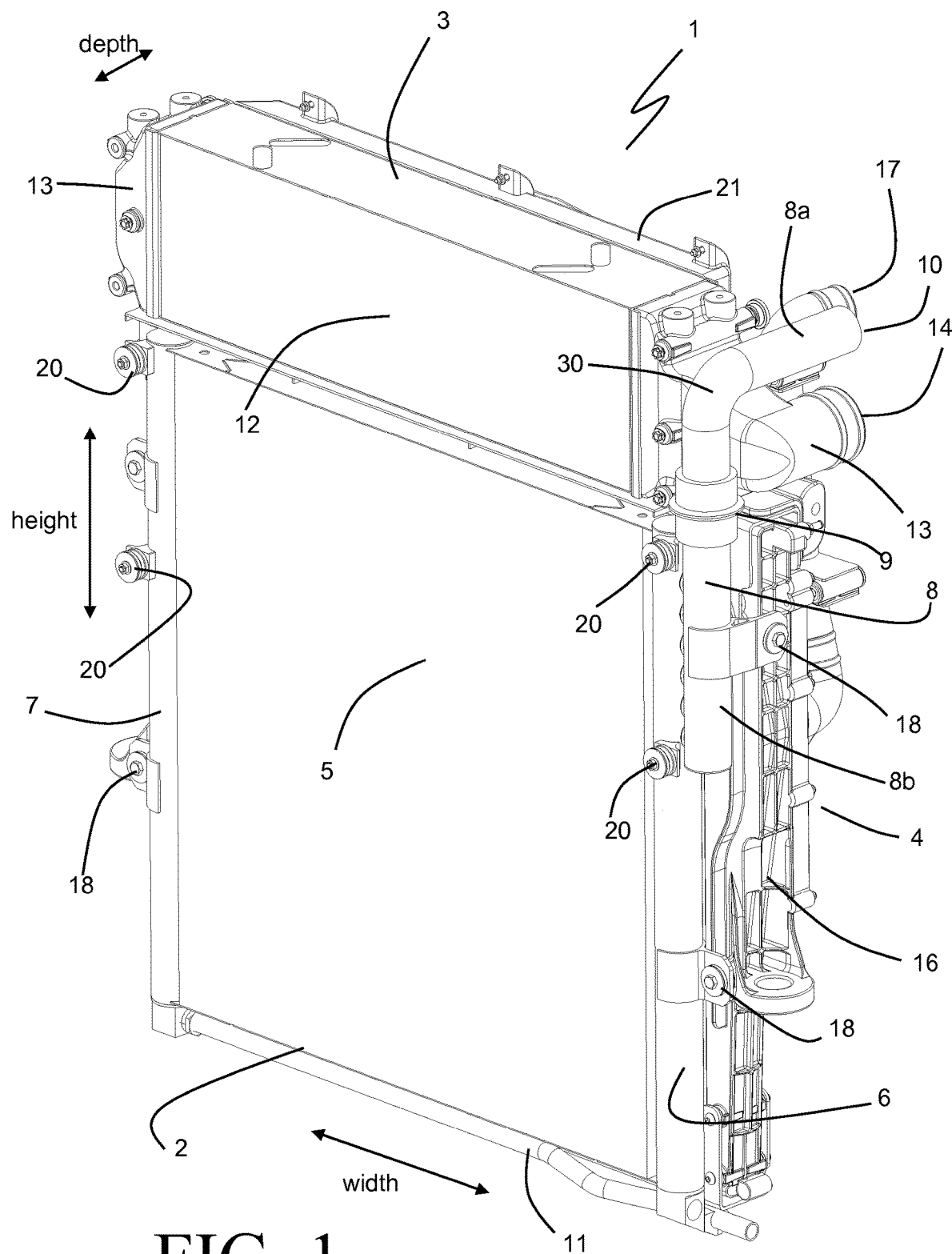
FIG. 1 is a perspective view of a cooling module according to an embodiment of the invention.
Figure 2:
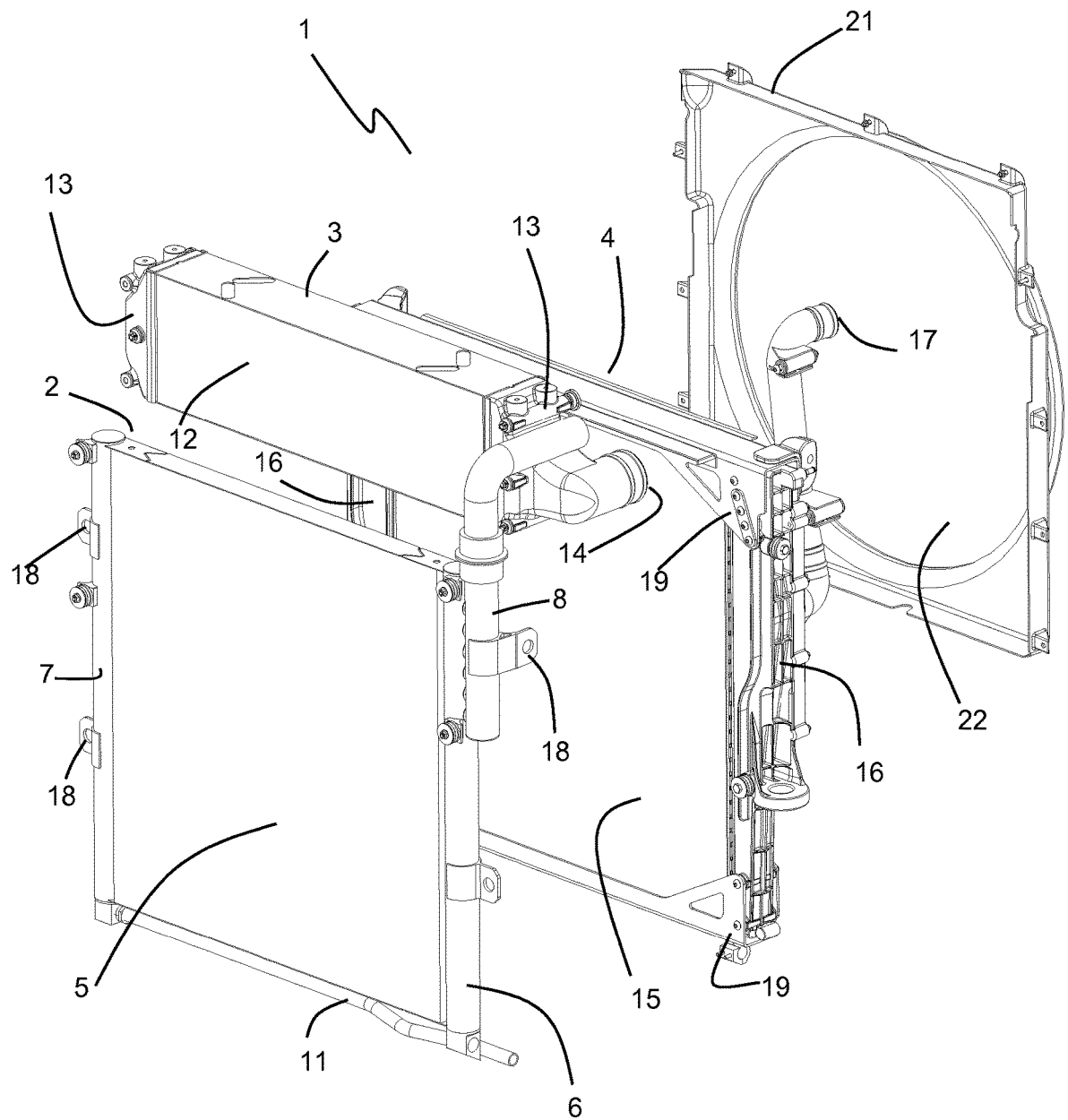
FIG. 2 is a partially exploded perspective view of the cooling module of FIG. 1.

A cooling module 1 according to some embodiments of the invention is shown in FIGS. 1 and 2, and can find particular utility as a heat rejection device for a coupled engine system and Rankine cycle waste heat recovery system. Such coupled systems might be used for stationary power generation, or in on-highway vehicles such as cars and trucks, or in off-highway vehicles such as cranes, excavators, loaders, and the like.

The cooling module 1 includes an air-cooled condenser 2 for cooling and condensing a flow of working fluid received from the Rankine cycle waste heat recovery system. Also included in the cooling module 1 is an air-cooled charge air cooler 3 for cooling a flow of compressed charge air to be used as the combustion air of the internal combustion engine in the engine system. Such a flow of compressed charge air can be provided by a supercharger or a turbocharger in order to boost the operating pressure of the engine, thereby providing increased engine power. Compression of the charge air tends to substantially increase its temperature, especially when such compression is accomplished through an exhaust-driven turbocharger, and cooling of the compressed charge air is usually desirable in order to both improve engine performance and meet required emission levels.

A coolant radiator 4 is also provided in the cooling module 1. The coolant radiator 4 rejects un-recovered waste heat from the engine system, such unrecovered waste heat being removed from the engine by a flow of liquid engine coolant that circulates between the engine system and the cooling module 1. Consequently, the cooling module 1 can provide for the rejection of waste heat from both an engine system and a Rankine cycle waste heat recovery system that is coupled to the engine system as a bottoming cycle.

Figure 7:
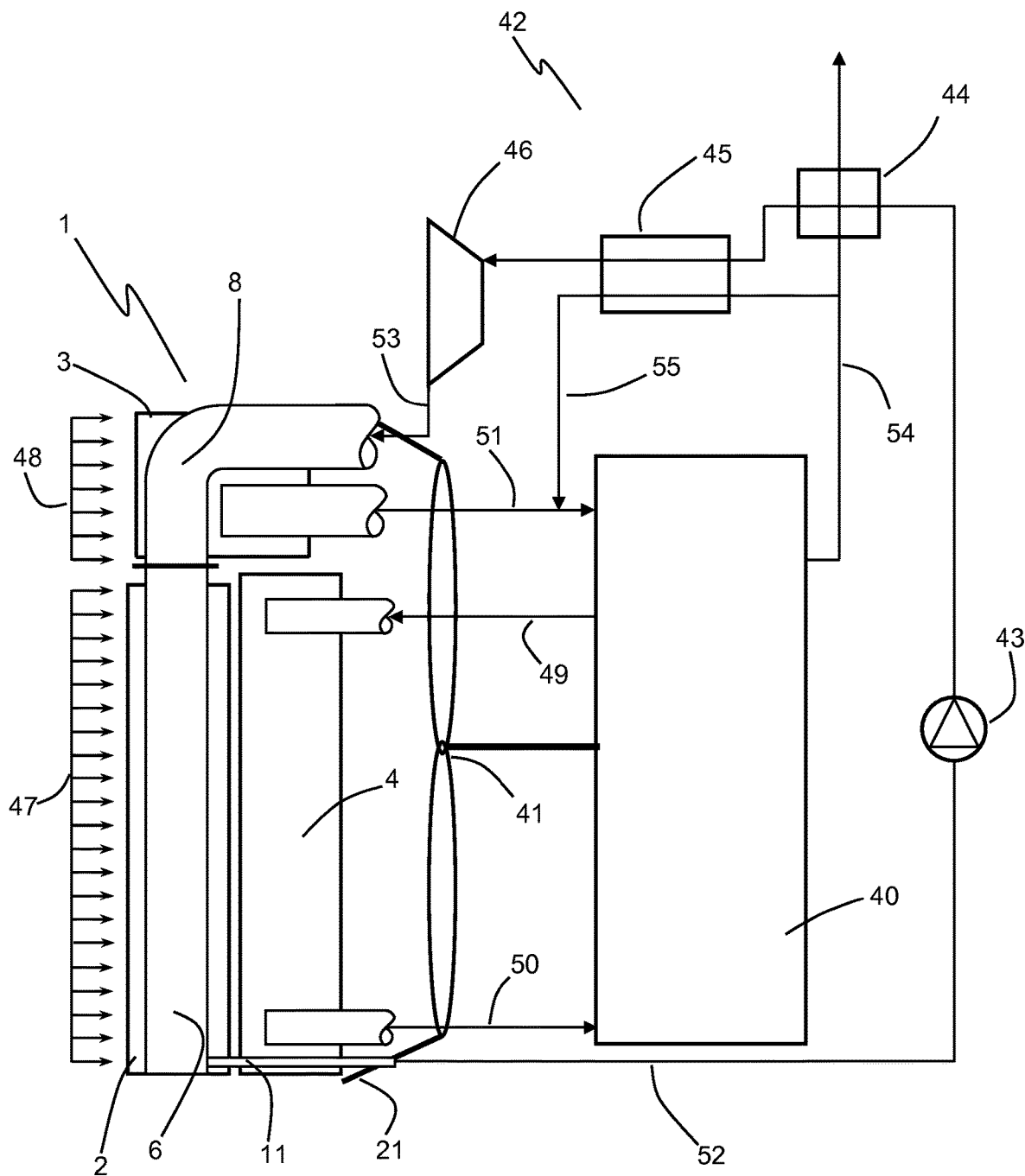
FIG. 7 is a diagrammatic view of a coupled engine system and Rankine cycle waste heat recovery system employing the cooling module of FIG. 1.

An example of such a coupled engine system 40 and Rankine cycle waste heat recovery system 42 is partially depicted in diagrammatic form in FIG. 7. The engine system 40 includes an internal combustion engine. Various types of such engines are well known, including Otto Cycle, Diesel Cycle, Stirling Cycle, Ericsson Cycle, Atkinson Cycle, and others. In general, such engines operate as heat engines that transfer thermal energy produced through the combustion of a fuel (e.g. gasoline, diesel, natural gas, propane) into mechanical power. This combustion typically uses ambient air as an oxidant, with the ambient air preferably boosted in pressure using residual energy contained in the exhaust gases. The engine system 40 further includes additional components and subsystems (including but not limited to a turbocharger, fuel delivery system, water pump, and others) that are well-known in the art of engines.

A typical engine system 40 will have an operating efficiency (i.e. a ratio of mechanical power delivered to heating value of fuel consumed) in the range of 25% to 50%, resulting in a substantial amount of energy being lost as so-called waste heat. A substantial portion of this waste heat is carried away from the engine as relatively low-grade heat in a liquid coolant that is circulated through the engine in order to maintain the physical components of the engine at an adequate operating temperature. The coolant radiator 4 is fluidly coupled to the engine system 40 to receive a flow of such engine coolant 49 from the engine system 40, and to return a cooled flow of engine coolant 50 back to the engine system 40.

A second substantial portion is carried away from the engine system 40 by the flow of exhaust gases 54 as relatively high-grade heat. A significant portion of that high-grade heat can be recovered through the coupling of a Rankine cycle system 42 to the engine system 40, where the Rankine cycle system 42 operates as a bottoming cycle to recover what would otherwise be waste heat and to convert that recovered heat to additional mechanical power.

The Rankine vapor power cycle is well known, and operates by pressurizing a flow of liquid working fluid, transferring heat energy into the pressurized liquid working fluid in order to vaporize it, and expanding the pressurized vapor through an expansion device that produces mechanical power. The Rankine cycle system 42 as illustrated operates as a closed loop system, requiring that the expanded vapor working fluid must be cooled and condensed back to a liquid state in order to complete the cycle.

The Rankine cycle waste heat recovery system 42 includes a working fluid pump 43 that receives a flow of liquid working fluid 52 from a liquid return line 11 of the condenser 2. The pump 43 pressurizes the liquid working fluid 52 to an elevated pressure, using power derived from the engine system 40 or from some other source of power. The working fluid can be selected to be one of several working fluids that are known to be useful in such Rankine cycle systems based on their thermodynamic properties, and can include: water; ammonia; alcohols, including but not limited to ethanol and methanol; refrigerants, including but not limited to R134a, R152a, and R22; hydrocarbons, including but not limited to propane and butane; organic working fluids, including but not limited to R245fa; and combinations thereof.

The pressurized liquid working fluid is delivered from the pump 43 through one or more heat exchangers wherein waste heat is recovered from one or more fluid streams of the engine system 40. In the exemplary embodiment two such heat exchangers are shown, but it should be understood that waste heat may be recovered in a single heat exchanger, or in more than two heat exchangers. A tail-pipe heat exchanger 44 is provided for the recovery of waste heat from the flow of engine exhaust 54. In some systems it may be preferable for a portion 55 of the engine exhaust 54 to be recirculated back to an intake manifold of the engine system 40, such as by blending the recirculated exhaust gas 55 into the flow of cooled charge air 51. In such systems it is especially desirable for the recirculated exhaust gas 55 to be cooled to a relatively low temperature in order for the engine system 40 to comply with regulated emission levels, and it can thus be beneficial for the waste heat from the recirculated exhaust gas 55 to be separately recovered in a waste heat recovery heat exchanger 45, which can take the place of a conventional exhaust gas recirculation (EGR) cooler.

The diagram of FIG. 7 shows the flow of Rankine cycle working fluid passing sequentially from the tail-pipe heat exchanger 44 to the exhaust gas recirculation heat exchanger 45, but it should be understood that various alternative fluid routing can exist, including flowing the working fluid through the heat exchangers in reverse order, flowing the working fluid through the heat exchangers in parallel, etc. In any event, the Rankine cycle working fluid is fully vaporized by the recovery of waste heat from the engine system 40 prior to being delivered to an expansion device 46 as a superheated vapor.

The expansion device 46 of the Rankine cycle waste heat recovery system 42 expands the vaporized working fluid from a high pressure vapor to a low pressure vapor, thereby extracting a portion of the enthalpy that had previously been recovered into the working fluid from the engine system 40 as additional mechanical power. This mechanical power can be used to augment the power produced by the engine system 40, or it can be used for some other purpose (e.g. as auxiliary power, or further converted into electrical power). Various types of expansion devices are known to be suitable for such a purpose, including turbines and piston expanders.

Inevitably, some amount of the waste heat that had been transferred into the Rankine cycle working fluid is unrecovered by the expansion device 46, and must be rejected from the expanded low pressure vapor working fluid 53 exiting the expansion device 46 in order to complete the thermodynamic cycle. To that end, the expanded vapor working fluid 53 is routed to an air-cooled condenser 2 of the Rankine cycle system 42, the condenser 2 being provided as part of the cooling module 1. The condenser 2 operates to reject the (often substantial) remaining waste heat from the working fluid 53 in order to fully condense the working fluid back to a liquid state, so that the working fluid can continue to be provided to the pump 43 as the flow of sub-cooled liquid 52. The amount of work that can be recovered by the expansion device 46 is to a large extent dependent on the saturation temperature of the vapor working fluid 53, with lower saturation temperature leading to an increase in the amount of work recovered. It is therefore highly desirable for the condenser 2 to be able to cool the working fluid to as low a temperature as possible, as that will lead to a lower saturation temperature of the working fluid and, consequently, improved waste heat recovery efficiency. This can be most readily achieved by providing the condenser 2 with an adequate supply of the lowest temperature cooling air available.

In addition to rejecting the unrecovered waste heat from the Rankine cycle 42, the cooling module 1 must also reject the aforementioned low-grade waste heat from the engine system 40, as well as any additional high-grade waste heat not transferred into the working fluid of the Rankine cycle system. The radiator 4 is therefore provided in the cooling module 1 to reject the low-grade waste heat from the flow of engine coolant.

Also provided in the cooling module 1 is the charge-air cooler 3 to reject waste heat from the flow of compressed charge air 51. Ambient air can be compressed through a supercharger or turbocharger of the engine system 40 in order to be used as boosted charge air for the internal combustion engine. Such compression of the air can be accomplished by locating a turbocharger (not shown) along the flow path of the engine exhaust 54, for example. The flow of compressed charge air is directed to the charge air cooler 3 after compression in order to be cooled, and is subsequently delivered to the engine system 40 as a flow of cooled charge air 51.

It is also highly desirable, both for purposes of emission control and for purposes of improved efficiency of the engine system 40, for the charge air 51 being supplied to the engine system 40 to be at as low a temperature as possible. This is also most readily achieved by providing the charge-air cooler 3 with an adequate supply of the lowest temperature cooling air available. However, the competing needs of the charge air cooler 3 and the waste heat recovery condenser 2 can lead to packaging challenges.

In order to allow for both the condenser 2 and the charge air cooler 3 to receive the lowest temperature cooling air, the cooling module 1 is located at an external boundary of the coupled engine system 40 and Rankine cycle waste heat recovery system 42. By way of example, in a vehicular application the cooling module 1 can be preferentially located at a leading end of the vehicle to receive the oncoming air for cooling purposes. The various heat exchangers of the cooling module 1 are arranged so that the charge air cooler 3 and the condenser 2 are arranged in parallel with respect to the incoming cooling air. Both the heat exchange core 5 of the condenser 2 and the heat exchange core 12 of the charge air cooler 3 are porous to a flow of cooling air in the depth direction of the cooling module. This allows for the incoming cooling air to be split into a first portion 47 that is directed through the heat exchange core 5 of the condenser 2 in order to cool the working fluid of the Rankine cycle system 42 to as low a temperature as is practicable, and a second portion 48 that is directed through the charge air cooler 3 in order to cool the combustion air of the engine system 40 to as low a temperature as is practicable. The radiator 4, which does not require as low of a temperature cooling air, is located directly behind the condenser 2 and receives the flow of cooling air 47 after it has passed through the condenser heat exchange core 5. The flow of cooling air 47 then passes through the heat exchange core 15 of the radiator 4 in order to adequately cool the engine coolant, the heat exchange core 15 of the radiator 4 also being porous to a flow of cooling air in the depth direction.

An air moving device 41 can be provided in order to induce the movement of the flows 47, 48 through the cooling module 1. Under certain operating conditions the requisite air movement can be provided without the need for such an air mover, such as when the cooling module 1 is provided in a vehicle moving at sufficient speed. However, even in vehicular applications it is oftentimes necessary for the requisite flow of air to be provided by the air moving device 1. The air moving device 41 can be a fan, blower, or the like, and preferably is powered by the engine system 40. The air mover 41 is preferably located directly behind the cooling module 1 so that the flow of cooling air 47, 48 is pulled through the cooling module 1 by the air moving device. A fan shroud 21 can be provided as part of the cooling module 1 in order to duct the flow of air from the heat exchangers of the cooling module 1 to the air mover device 41, with the air moving device occupying a swept volume 22 within the fan shroud.

Certain challenges arise when attempting to package into a single cooling module 1 both heat rejection components for the engine cooling system 40 and the Rankine cycle waste heat recovery system 42. As it is desirous for both the condenser 2 and the charge air cooler 3 to receive the coolest air, these two components are preferably both located at or near the outermost end of the cooling module 1 in the cooling module depth direction (the depth direction being indicated in FIG. 1). In other words, it is preferable for the air inlet faces of both the heat exchange core 5 of the condenser 2 and the heat exchange core 12 of the charge air cooler 3 to be located further from the air mover 41 than, for example, the air inlet face of the heat exchange core 15 of the radiator 4. Such a packaging arrangement is complicated, however, by the fact that the both the charge air flow 51 and the expanded vapor Rankine cycle working fluid flow 53, being relatively high flow rates at relatively low density, require plumbing of rather large size which must pass to the front of the cooling module 1 without interfering with the swept volume 22 of the air mover 41. This can be especially problematic in vehicular applications, wherein it is desirable for the heat exchange cores 5 and 12 to occupy as much of the available space as possible in the width dimension of the cooling module 1, such available space typically being in short supply.

In order to address the problem described above, the cooling module 1 is constructed so that the charge air cooler 3 is provided directly above the condenser 2 in the height direction of the cooling module 1. The inventor has found that in vehicular applications the available space for the cooling module 1 in the width direction is typically more heavily constrained at the lower end of the height direction than at the upper end, due to obstructions such as wheel wells, frame rails, hood mounts, etc. The condenser 2 can be sized to occupy the maximum available space in the width direction at its lower end in order to maximize the width dimension of the heat exchange core 5.

Figure 3:
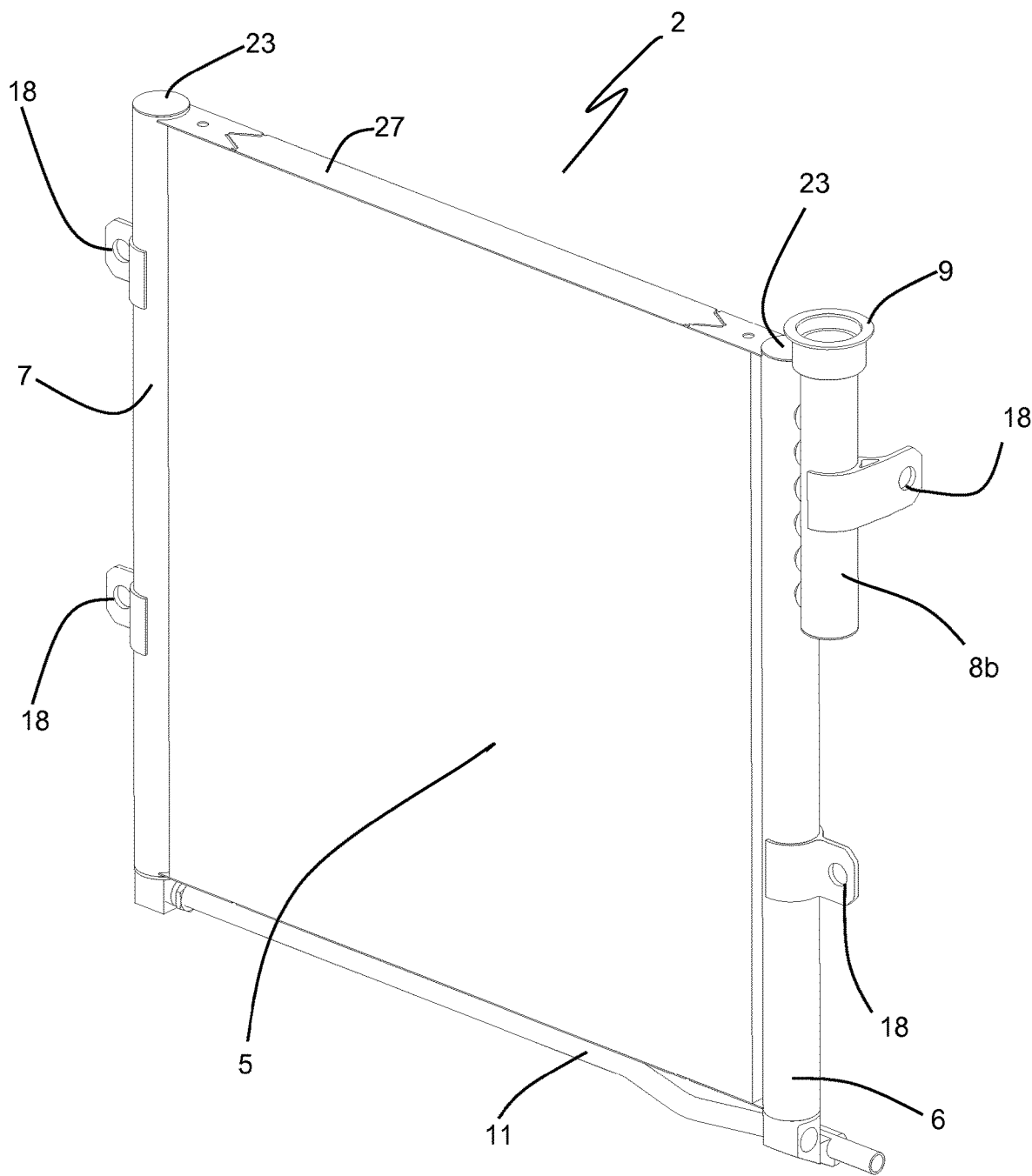
FIG. 3 is a perspective view of a Rankine cycle condenser used in the cooling module of FIG. 1.

As best seen in FIG. 3, the condenser 2 includes tubular headers 6 and 7 at opposing ends of the heat exchange core 5 in the width direction. The tubular headers are of a cylindrical shape, which is desirable in order to withstand the elevated pressures that can be experienced in the sealed working fluid system, especially during periods when the system is in high ambient temperature environments. These tubular headers 6, 7 are arranged vertically in order to minimize their impact on the available width of the heat exchange core 5 at the lower end (in the height direction of the module 1) of the condenser 2. At the lower end of the condenser 2, the total dimension of the condenser 2 in the width direction is, then, the sum of the width of the heat exchange core 5 and the diameters of the two headers 6, 7.

The heat exchange core 12 of the charge air cooler 3 has an approximately similar dimension in the width direction as the heat exchange core 5 of the condenser 2, but is substantially smaller in the height direction and substantially larger in the depth direction. Specifically, in the exemplary embodiment, the dimension of the heat exchange core 12 in the height direction is approximately 30% of that of the heat exchange core 5, whereas the dimension of the heat exchange core 12 in the depth direction is 250% of that of the heat exchange core 5. The charge air cooler 3 employs cast tanks 13 at either end of the heat exchange core 12 in the width direction, with those cast tank 13 effecting a right-angle turn of the flow of charge air between the heat exchange core 12 and a port 14 provided in each of the tanks 13 to fluidly couple the charge air cooler 3 to the engine system 40. The compressed air is delivered along the depth direction into a first one of the tanks 13, that first one of the tanks operating as an inlet tank and the port 14 of that tank 13 functioning as an inlet port. Similarly, the cooled compressed air is delivered back to the engine system 40 along the depth direction from a second one of the tanks 13 operating as an outlet tank, with the port 14 of that tank 13 functioning as an outlet port. As somewhat more space in the width direction is generally available at the upper end of the cooling module 1, the tanks 13 can be accommodated into the available space without requiring a reduction in the width direction of the heat exchange core 12.

By arranging the charge air cooler 3 directly above the condenser 2, the heat exchange cores 5 and 12 will naturally separate the incoming flow of air into the first and second portions 47 (directed through the condenser 2) and 48 (directed through the charge air cooler 3). The structures of the heat exchange cores will maintain those two portions of air as separate flows which are eventually recombined in the swept volume 22.

Since the heat exchange cores 5 and 12 are approximately equal and aligned in the width direction, entry of the expanded vapor Rankine cycle working fluid flow 53 directly into an end of the inlet header 6 of the condenser 2 is problematic, as one of the tanks 13 is located directly above the header 6. The exemplary embodiment of the present invention addresses this by providing a working fluid transfer tube 8 to fluidly couple the inlet header 6 to the Rankine cycle waste heat recovery system 42. The transfer tube 8 includes a first portion 8a extending in the cooling module depth direction from an inlet port 10, the first portion 8a being arranged directly above a part of one of the tanks 13, and a second portion 8b connected to the first portion 8a and extending in the cooling module height direction. The two portions 8a,b are joined by an elbow 30, allowing for a smooth redirection of the working fluid flow as it passes through the transfer tube 8. A coupling flange 9 is provided along the second portion 8b in order to separate the transfer tube 8 into two pieces, thereby facilitating assembly and alignment. It should be understood, however, that such a coupling flange 9 is optional and the transfer tube 8 can also be provided as a single piece.

By routing the transfer tube 8 over a part of one of the tanks 13, adequate space can be provided to accomplish the turning of the working fluid flow through the elbow 30. This can also provide for an advantageous arrangement of the inlet port 10 of the transfer tube 8 directly above one of the ports 14 of the charge air cooler 3 (with that port 14 functioning as either the charge air inlet port or the charge air outlet port, depending on the connection to the engine system 40). Such an arrangement can provide for simplified connections of both the condenser 2 to the Rankine cycle waste heat recovery system 42, and the charge air cooler 3 to the engine system 40. In addition, as best seen in the exploded view of FIG. 2, the placement of those ports 10 and 14 (along with a radiator port 17 to deliver engine coolant either to or from a coolant tank 16 of the radiator 4) in a corner of the cooling module 1 enables the fluid connections to the respective systems to pass by the air mover device which would be occupying the swept volume 22 provided by the fan shroud 21.

Figure 4:
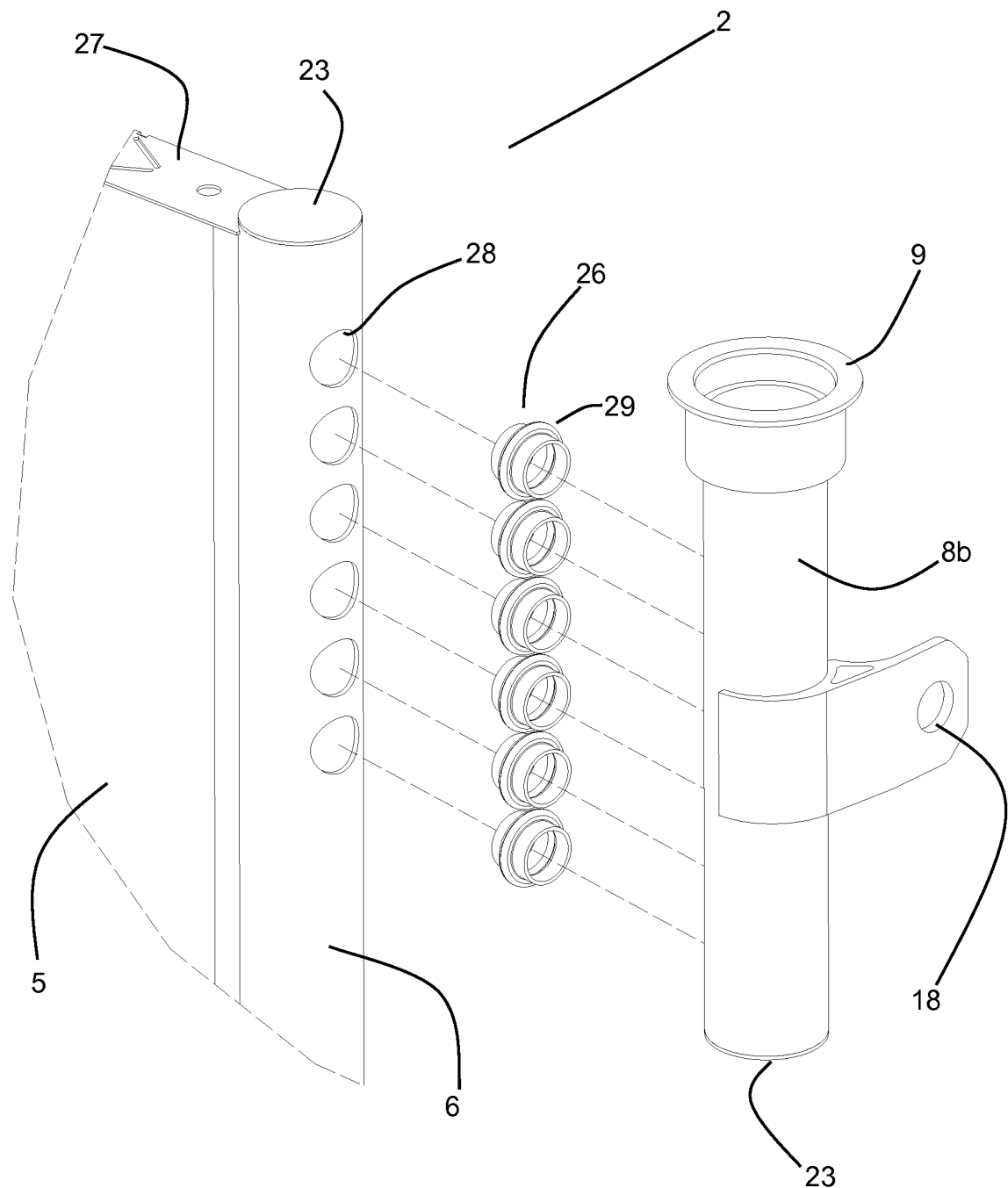
FIG. 4 is a partially exploded partial view of the Rankine cycle condenser of FIG. 3.
Figure 5:
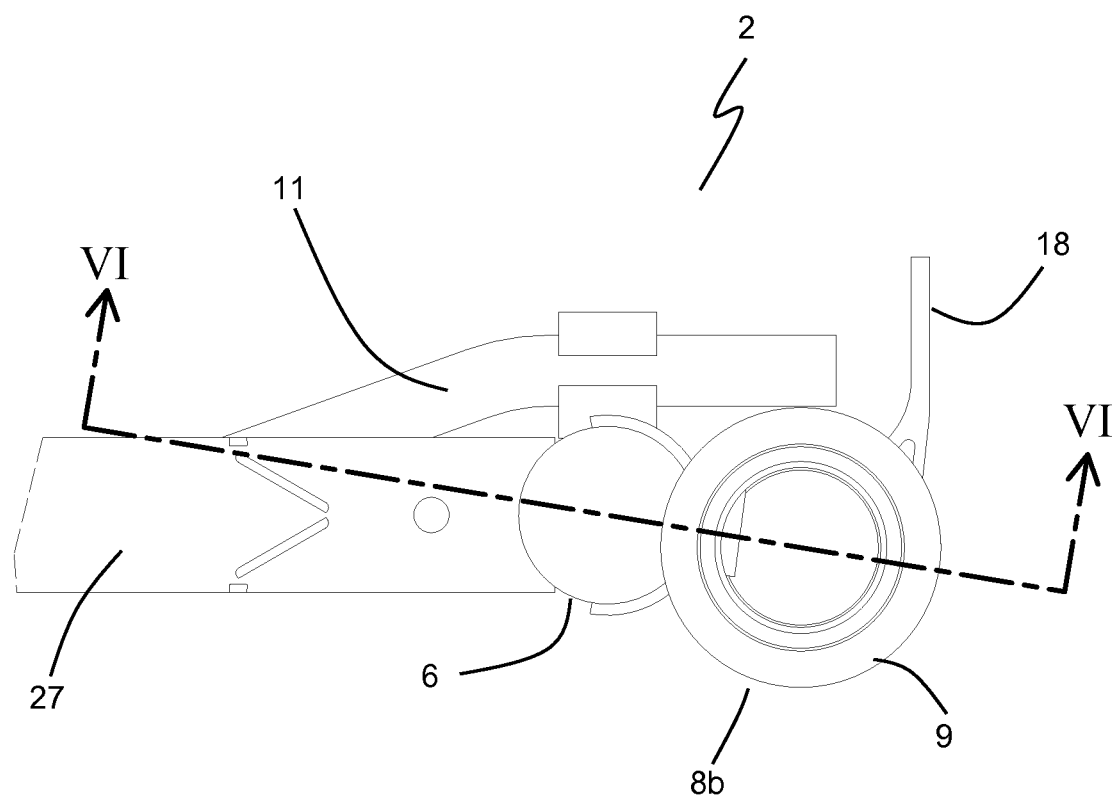
FIG. 5 is a partial top view of the condenser of FIG. 3.
Figure 6:
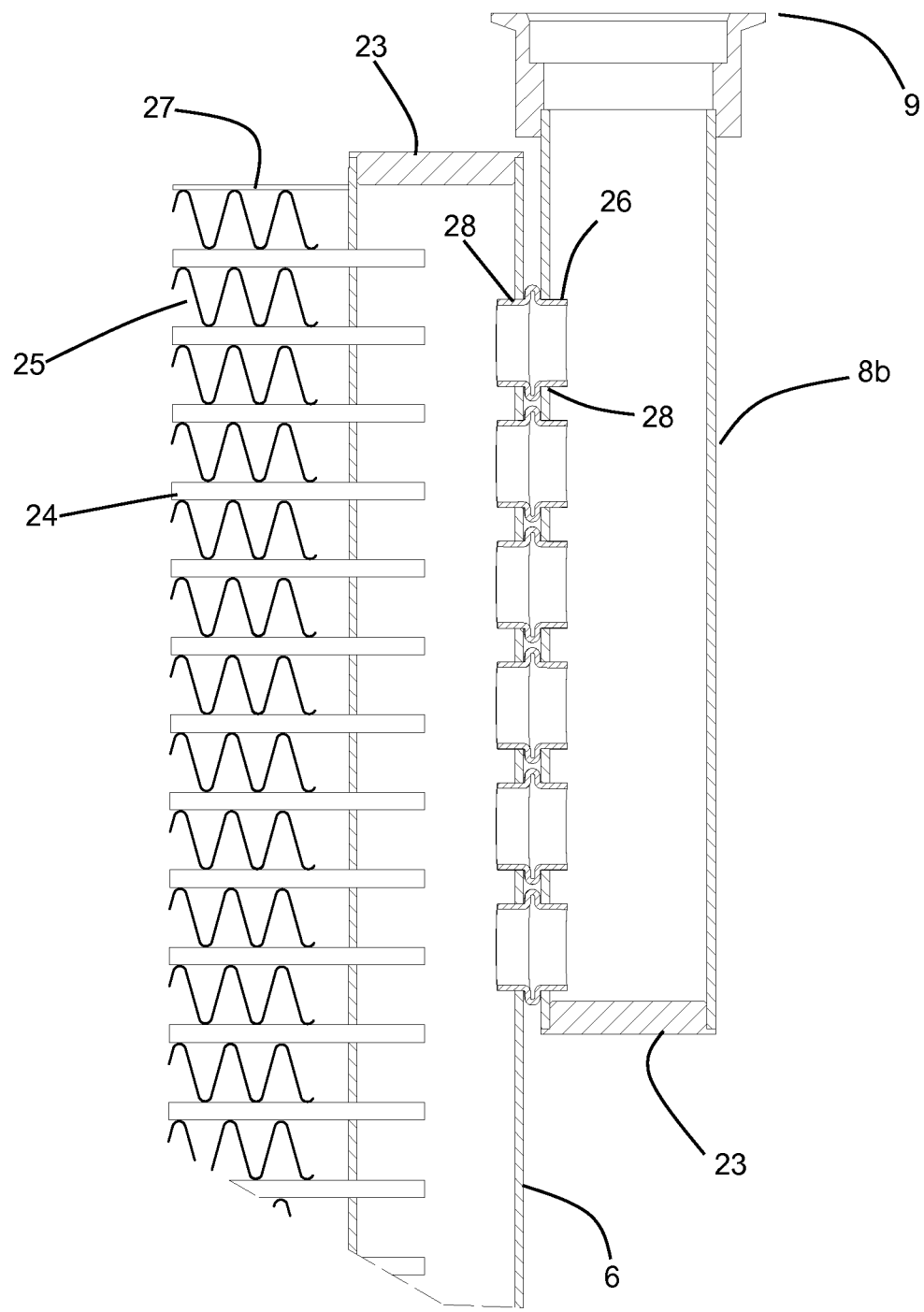
FIG. 6 is a partial section view taken along the lines VI-VI of FIG. 5.

Turning now to FIGS. 4 and 6, the connection between the inlet header 6 and the working fluid transfer tube 8 will be described. The portion 8b of the transfer tube 8 extends parallel to and alongside the inlet header 8, so that there is at least a partial overlap between the two in the height direction of the cooling module 1. Matching circular apertures 28 are provided over that overlapping length, and cylindrical connecting conduits 26 are received within the apertures 28 to fluidly and structurally join the transfer tube 8 and the inlet header 6. A bead 29 can be provided at a central location of each of the connecting conduits 26 to define the spacing between the two components, as well as to ensure that the connecting conduits 26 are appropriately received within the apertures 28 of both the transfer tube 8 and the inlet header 6.

The extent of the overlap along the height direction can be adjusted based upon the available space in the width direction towards the lower end of the cooling module 1. In some preferable embodiments, such as the exemplary embodiment of FIGS. 1-6, the transfer tube 8 does not extend beyond the midway point of the condenser 2 in the height direction, so that the region of overlap between the transfer tube 8 and the inlet header 6 is entirely within the top half of the condenser 2. This allows for a greater usage of the available width to accommodate the heat exchange core 5, as the bottom half of the condenser 2 is where obstructions that limit the available width are more likely to be encountered.

As further shown in FIG. 6, the heat exchange core 5 of the condenser 2 is, in some embodiments, constructed of an array of flat tubes 24 extending between the headers 6 and functioning as fluid conduits for the working fluid between those headers, alternating with corrugated air fins 25. A side sheet 27 is shown located at the top end of the heat exchange core 5, and a similar side sheet is located at the bottom end. Ends of the tubes 24 extend through slots into the headers at either end. The upper and lower terminating ends of the headers 6 and 7 can be closed off with end caps 23, and an additional end cap 23 can be provided to close off a lower terminating end of the transfer tube 8. In some preferable embodiments the condenser 2 is constructed of aluminum alloys, and the headers 6 and 7, the tubes 24, the corrugated air fins 25, the side sheets 27, and the end caps 23 of the headers 6 and 7 are joined in a brazing operation. In some especially preferable embodiments the portion 8b of the transfer tube 8, the conduits 26, and half of the flange connection 9, along with the end cap 23 of the transfer tube 8, can be joined in the same brazing operation.

The number of connecting conduits 26 can be varied in order to match the available length of overlap, and in order to provide sufficient flow area to allow for adequate distribution of the Rankine cycle working fluid among the tubes 24. This allows for the Rankine cycle working fluid to be effectively delivered into the tubular header 6 without requiring a large amount of space in the width direction.

As the Rankine cycle working fluid passes through the heat exchange core 5 in the flat tube fluid conduits 24, heat from the working fluid is convectively transferred to the air flow 47 passing over the outer surfaces of the flat tubes 24. The corrugated air fins 25 provide augmented surface area for such convective heat transfer. In some embodiments the corrugated air fins 25 can be provided with flow turbulation features such as louvers, lances, slits, bumps, and the like in order to further boost the rate of heat transfer. As heat is rejected from the Rankine cycle working fluid, it is condensed back to a sub-cooled liquid suitable for recirculation through the Rankine cycle system 42 by the working fluid pump 43. The working fluid has a substantially greater density in a liquid state, so that the liquid return line 11 that is used to return the condensed working fluid to the pump 43 can be of substantially smaller size than the transfer tube 8 that delivers the working fluid to the condenser 2 in a vapor state. Consequently, the positioning and routing of the liquid return line 11 does not pose the same packaging difficulties. It should be noted that the working fluid can experience more than one pass through the heat exchange core 5 (by, for example, placing baffles within one or both of the headers 6 and 7 in order to divide the flow conduits 24 into two or more serially arranged groups of conduits). In some cases (such as when the number of passes through the heat exchange core 5 is an even number) the liquid return line can extend from the header 6 in place of from the header 7.

The heat exchange core 12 of the charge air cooler 3 and the heat exchange core 15 of the radiator 4 can be of a similar tube and fin construction as described above for the heat exchange core 5 of the condenser 2, with flat headers in place of the tubular headers. Alternatively, one or both of those cores can be constructed in other known heat exchanger architectures such as, for example, bar-plate.

The heat exchange core 15 of the radiator 4 is somewhat similar in size (along the height and width directions) as the heat exchange core 5 of the condenser 2. Inlet and outlet tanks 16 are provided at the ends of the heat exchange core 15 in the width direction, with a port 17 (only one is shown) connecting to each of the tanks 16 to allow for fluid coupling of the radiator 4 to the engine system 40. Engine coolant is conducted through the heat exchange core 15 between the tanks 16 in a similar fashion as has been described for the condenser 2 and the charge air cooler 3. The tanks 16 can advantageously be produced as injection-molded plastic tanks, or alternatively as cast aluminum tanks, with structural mounting features integrated directly therein.

The charge air cooler 3 and the radiator 4 are provided as examples of heat exchangers to reject a portion of the waste heat produced by the engine system 40 to air directly from a fluid of the engine system 40. Some alternative embodiments can provide similar functionality by rejecting engine waste heat from different fluids of the engine system 40. By way of example, in some alternative embodiments the air cooled charge air cooler 3 can be replaced by a low temperature radiator to cool a flow of liquid coolant to a near-ambient temperature, with the flow of liquid coolant then being used to cool the charge air directly within the engine system 40.

Mounting features 18 for structurally assembling the condenser 2 into the cooling modules 1 can be brazed onto the headers 6 and 7 and, optionally, onto the transfer tube 8, as shown. These mounting locations 18 can interface with corresponding mounting features provided on the tanks 16 of the radiator 4, so that the radiator 4 can be the main structural support member of the cooling module 1. A structural frame 19 can be provided as part of the cooling module 1 in order to secure the entire cooling module 1. In some embodiments it may be preferable for the condenser 2 to be mounted directly to such a structural frame 19, rather than to the radiator 4.

Additional components may be integrated into the cooling module 1 as well, and in some cases it may be desirable to employ the Rankine cycle condenser 2 as a structural support feature for such additional components. By way of example, an air conditioning condenser (not shown) can be mounted in front of the Rankine cycle condenser 2 by incorporating mounting locations 20 onto the headers 6 and 7. Such an air conditioning condenser 2 adds only minimal heat load to the cooling air, and does not require the large connections that the Rankine cycle condenser requires, thus greatly simplifying the routing of fluid lines to and from that component.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

I claim:

1. A cooling module for rejecting heat from a coupled engine system and Rankine cycle waste heat recovery system, comprising:
   a condenser for cooling and condensing a working fluid of the Rankine cycle waste heat recovery system, comprising:
   a condenser core including a first plurality of fluid conduits extending along a width direction of the cooling module, the condenser core being porous to a flow of cooling air in a depth direction of the cooling module;

a first tubular header extending in a height direction of the cooling module, arranged at a first end of the condenser core and fluidly coupled to the first plurality of fluid conduits; and a second tubular header extending in the height direction of the cooling module, arranged at a second end of the condenser core opposite the first end of the condenser core and fluidly coupled to the first plurality of fluid conduits;

a heat exchanger for cooling a fluid of the engine system, comprising:

a heat exchanger core including a second plurality of fluid conduits extending along the width direction of the cooling module, the heat exchanger core being porous to a flow of cooling air in the depth direction of the cooling module;

a first fluid tank arranged at a first end of the heat exchanger core and fluidly coupled to the second plurality of working fluid conduits, the first fluid tank having an inlet port to fluidly couple the first fluid tank to the engine system; and a second fluid tank arranged at a second end of the heat exchanger core opposite the first end of the heat exchanger core and fluidly coupled to the second plurality of working fluid conduits, the second fluid tank having an outlet port to fluidly couple the second fluid tank to the engine system; and a working fluid transfer tube to fluidly couple the first tubular header to the Rankine waste heat recovery cycle system, the transfer tube having a first portion extending in the cooling module depth direction and a second portion extending in the cooling module height direction, the first portion being adjacent to the heat exchanger core in the cooling module width direction, the second portion being adjacent to the first tubular header in the cooling module width direction and at least partially overlapping the first tubular header in the cooling module height direction, wherein the condenser core and the heat exchanger core are arranged to be in parallel with respect to a flow of cooling air through the cooling module.

2. The cooling module of claim 1, wherein the condenser core has a first core width, the heat exchanger core has a second core width approximately equal to the first core width, and the condenser core and heat exchanger core are generally aligned with one another in the cooling module width direction.

3. The cooling module of claim 1, wherein the heat exchanger is located directly above the condenser.

4. The cooling module of claim 3, wherein the first portion of the working fluid transfer tube is arranged directly above one of the inlet port and the outlet port.

5. The cooling module of claim 1, wherein the heat exchanger is a charge air cooler.

6. The cooling module of claim 1, wherein the working fluid transfer tube is joined to the first tubular header by a third plurality of fluid conduits.

7. The cooling module of claim 1, wherein the first tubular header has an upper terminating end and a lower terminating end, and wherein the working fluid transfer tube is entirely located above a position midway between the upper and lower terminating ends.

8. The cooling module of claim 1 wherein the heat exchanger is a first heat exchanger and the heat exchanger core is a first heat exchanger core, further comprising a second heat exchanger for cooling a fluid of the engine system, the second heat exchanger having a second heat exchanger core arranged directly adjacent to the condenser core in the depth direction of the cooling module.

9. The cooling module of claim 8, wherein the condenser is structurally mounted to the second heat exchanger.

10. The cooling module of claim 1, wherein the working fluid transfer tube is fluidly connected to the first tubular header along a portion of the cooling module height direction bounded at a lower end by a terminating end of the second portion of the working fluid transfer tube and at an upper end by a terminating end of the first tubular header.

11. The cooling module of claim 1, wherein the first portion of the working fluid transfer tube extends above a portion of one of the first and second fluid tanks in the cooling module height direction and wherein the second portion of the working fluid transfer tube extends in front of a portion of said one of the first and second fluid tanks in the cooling module depth direction.

12. The cooling module of claim 1, wherein the working fluid transfer tube includes a first part and a second part joined to the first part by a coupling flange.

13. The cooling module of claim 12, wherein the first part includes some of the second portion of the working fluid transfer tube and wherein the second part includes the remainder of the second portion of the working fluid transfer tube.

* * * * *